United States Patent [19]
Zimmermann

[11] 3,760,563
[45] Sept. 25, 1973

[54] DRAWING APPARATUS FOR SEALING CONTAINERS

[76] Inventor: Guenter Zimmermann, 600 Caster Ave., Clearwater, Fla.

[22] Filed: Dec. 13, 1971

[21] Appl. No.: 207,191

[52] U.S. Cl.................. 53/329, 53/373, 156/583
[51] Int. Cl.............................................. B65b 7/28
[58] Field of Search............................ 53/329, 373; 156/583

[56] References Cited
UNITED STATES PATENTS
3,488,472  1/1970  Pizarro.............................. 53/329 X
3,102,182  8/1963  Oelze et al......................... 53/373 X Primary Examiner—Travis S. McGehee
Attorney—Stein & Orman

[57] ABSTRACT

A device for sealing aluminum lids to aluminum containers comprising an annular cup retaining anvil including a centrally disposed cup receiving orifice. The upper horizontal face of the anvil comprises a cup rim support having an annular drawing channel formed therein. A reciprocating heat sealing head is arranged immediately above and in concentric alignment with the anvil having its lower horizontal sealing face parallel to the cup rim support. The sealing face includes an annular drawing bead of a diameter substantially equal to that of the drawing channel. To seal, a container is placed in the cup receiving orifice with its rim resting on the cup rim support. After a lid is placed over the cup opening the heat sealing heat is moved downward engaging the upper surface of the lid, compressing the lid and cup rim between the heat sealing face and cup rim support. At the same time, the drawing bead passes downward into the drawing channel drawing the cup rim downward under its force. The strength and malleableness of the aluminum rim in combination with the compression forces, heat seal coatings and heat applied to the lid and rim form a seal at the point of drawing.

4 Claims, 6 Drawing Figures

PATENTED SEP 25 1973　3,760,563

DRAWING APPARATUS FOR SEALING CONTAINERS

BACKGROUND OF THE INVENTION

Field of the Invention

The present invention relates to a device for sealing aluminum lids to aluminum containers. More particularly the invention relates to an apparatus comprising a heat sealing head including an annular drawing bead in combination with an annular cup retaining anvil including an annular drawing channel whereby the container and lid are compressed together to form a gas tight seal by drawing the cup rim under the cooperative action of the anvil and sealing head. the quality of the bond or seal. Lids made of paper or other such material have been used in an attempt to correct for these anmalies. Unfortunately these materials absorb substantial amounts of heat requiring greater amounts of heat to form the seal. Thus scorching often results which is undesirable from a consumer appearance standpoint. Of course the additional heat requirements reduce the efficiency of the operation. Further, such lids when exposed to changes in moisture and temperature often curl thereby creating a problem in dispensing and sealing. As a result, many producers have resorted to metallic lids. Some processes employ thick metallic lids which melt into a rim or ridge formed in the container to compensate of machine tolerances. This additional material increases the cost as well as reduces the speed of the capping operation due to the increased heat and pressure requirements.

Where a thin metallic lid is used the problem of component irregularities still exist. To compensate for the various irregularities some containers use a resilient ring within each lid. This ring is of course an additional expense and in most cases slows down the sealing or capping process.

Notwithstanding initial tolerance requirements to assure an acceptable seal, the heat sealing head and container retaining means, these components are exposed to the environmental conditions of heat, pressure, and contamination of the heat sealing surfaces which over a period of time cause irregularities. Even without wear and heat distortion, non-uniformity of the machine components, irregular thicknesses of the container and/or lid may decrease the effectiveness of the seal.

Thus the requirements for an effective means of rapidly and efficiently sealing metallic containers to metallic lids is obvious.

SUMMARY OF THE INVENTION

This invention relates to a method and device for sealing metallic lids to metallic containers. More specifically, this device comprises an annular cup retaining anvil including a centrally disposed cup receiving orifice. The upper horizontal face of the anvil comprising a cup rim support having an annular drawing channel formed therein such that the face extends upward on either side of the channel to support the under portion of the cup rim of a cup placed into the receiving orifice.

A reciprocating heat sealing head is located immediately above the anvil and concentrically aligned therewith. The heat sealing head comprises a reciprocating member having at its lower extreme, an annular horizontally disposed heat sealing face parallel to the cup rim support. The heat sealing face includes an annular drawing bead substantially the diameter of the annular drawing channel and concentrically aligned therewith when the anvil is in the sealing station and the heat sealing face heated to expansion. The outside dimensions of the drawing bead are relative to the drawing channel such that when the heat sealing face compressed against the cup rim support the drawing bead will be disposed within the drawing channel without engaging the walls of the drawing channel.

A plurality of anvils may be mounted within a conveyor-like structure or similar platform to hold containers upright and convey these containers from station to station during the filling and sealing process.

A corresponding plurality of heat sealing heads would be disposed to proper alignment when the anvils reach the sealing station.

When in operation, the anvils are advanced from station to station where cups are fed into the cup receiving orifices, filled with product and covered with a lid and finally to the sealing station. When at the sealing station, the heat sealing head and anvil are aligned along the vertical axis. In this position the heat sealing head is moved downward by external means causing the heat sealing face to engage the upper surface of the lid. As the heat sealing head continues to travel downward the lid and container rim supported by the cup rim support are compressed together. Simultaneously, the drawing bead passed through the horizontal plane of the cup rim support into the drawing channel drawing the cup rim downwardly under its force and at the same time compressing the lid into the draw formed in the cup rim. Under the heat and compression forces generated between the cup rim support and heat sealing face and at the draw a bond is formed between the lid and cup rim.

An important feature of this invention is the drawing bead in combination with the drawing channel which together compensate for any irregularities in thickness of the container lip and/or lid as well as any irregularities in the components of the apparatus. This is possible since the drawing process permits the inner edges of the cup rim support to act as fulcrum against the downward force of the drawing bead thereby obviating any exacting parallelism between the heat sealing face and cup rim support.

The present invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

DETAILED DESCRIPTION

Figure 1:
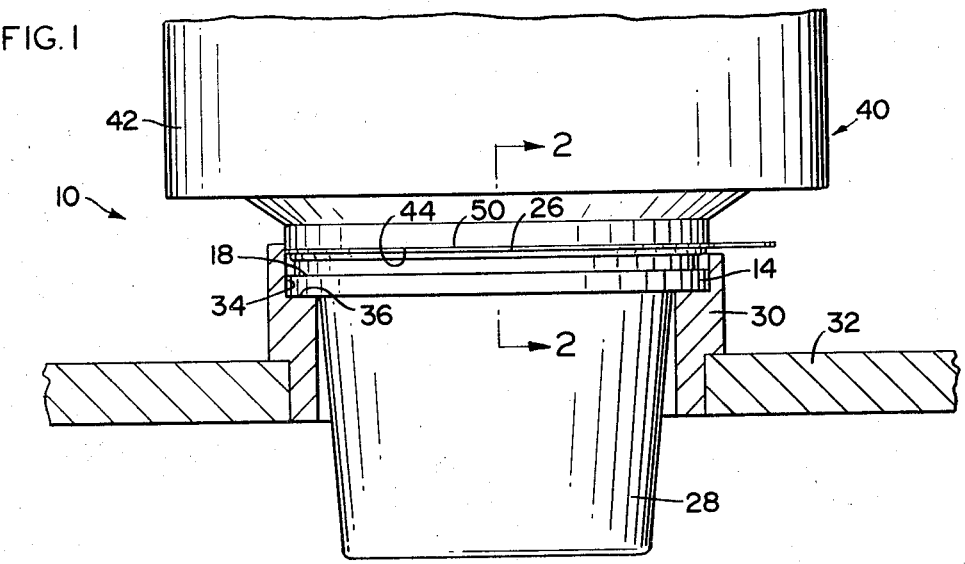
FIG. 1 is a side view of the device in heat sealing position.
Figure 2:
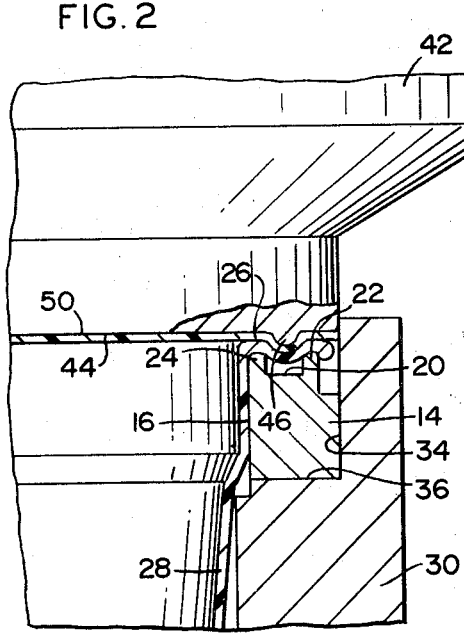
FIG. 2 is a cross-sectional view of the device taken along line 2—2 of FIG. 1.
Figure 3:
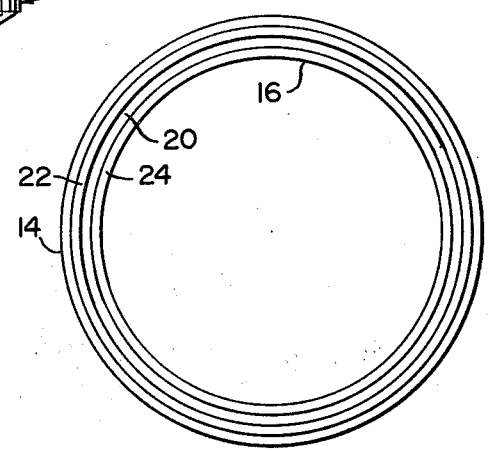
FIG. 3 is a top view of the annular anvil with drawing channel.
Figure 6:
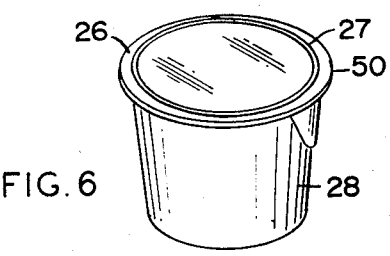
FIG. 6 is a container/lid combination sealed together by the sealing device.
Figure 4:
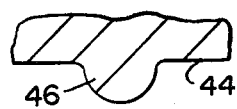
FIG. 4 is a cross-sectional view of the heat sealing head with drawing bead.
Figure 5:
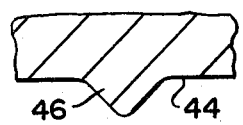
FIG. 5 is a cross sectional view of the heat sealing head with an alternative drawing bead.

As shown in FIG. 1 this invention relates to a device generally indicated at 10, for closing and sealing metallic containers with metallic lids. Device 10 comprises a heat sealing head 40 and a cup retaining means including an annular cup retaining anvil 14. With reference to FIG. 3, annular cup retaining anvil 14 includes a central cup receiving orifice 16. The upper horizontal face 18 of anvil 14 comprises a cup rim support having an annular drawing channel 20 formed therein such that the face 18 extends upward on either side of the channel 20 to form support ledges 22 and 24. These ledges support the under portion of the cup rim 26 of a cup 28 placed in the receiving orifice 16. A plurality of anvils are mounted within annular couplers 30 arranged in a series of rows and columns within a conveyor-like platform 32 which could be considered as a support means. Annular couplers 30 include a stepped portion 34 with a horziontally disposed ledge 36 upon which the under surface of anvils 14 are seated. Although a conveyor-like platform 32 is used in the preferred embodiment, a rotary or other suitable platform may be used.

A plurality of reciprocating heat sealing heads 40 are located about the platform 32, each heat sealing head 40 corresponding to a column anvils 14. Each heat sealing head 40 comprises a vertically disposed reciprocating cylindrical body 42 having at its lower extreme a horizontally disposed annular heat sealing face 44 parallel to the cup rim support. The heat sealing face 44 includes an annular drawing bead 46 substantially the diameter of the drawing channel 20. The plurality of heat sealing beads 40 are arranged in a row such that when in the sealing position or station, the row of heat sealing heads 40 are located immediately above the corresponding row of anvils 14, the drawing bead 46 being concentrally aligned with the drawing channel 20.

In operation, cups 28 are placed into receiving orifices 16 where cup rim 26 seats on the horizontal support ledges 22 and 24 of the anvil 14. A the cups or containers 28 are filled they are advanced by movement of the platform 32 to a capping station where a lid 50 including a heat seal coating on its under surface is placed over the opening of each container 28. Cups 28 and lids 50 are then advanced to the sealing station. Upon reaching the sealing station, each heat sealing head 40 and corresponding anvil 14 is aligned along the vertical axis, as previously discussed. When in this position the heat sealing head 40 is moved downward by external means (not shown) causing the heat sealing face 44 to engage the upper surface of lid 50. As the heat sealing head 40 continues to travel downward, the lid 50 and rim 26 are compressed together between heat sealing face 44 and ledges 22 and 24 applying heat and pressure melt the heat seal coating thereby bonding the lid 50 and rim 26 together.

Simultaneously, the drawing bead 46 passes through the horizontal plane of the cup rim support into the drawing channel 16 drawing the mid-portion on 27 of the cup rim 26 downward into the drawing channel 16, compressing the lid 50 into the drawn portion 27 of the rim 26 melting the heat seal coating to form a gas tight seal. Since the drawing bead 46 which provides the major heat seal contact surface is separated from the anvil 14 there is a minimum of heat sink loss. Sealing through the drawing process compensates for any irregularities in thickness of the cup rim 26 and/or lid 50. Irregularities in the components of the sealing device 10 such as unevenness in the heat sealing face 44 or the upper surface of anvil 14 also may decrease the effectiveness of the seal. Further the horizontal planes of the heat sealing face 44 and anvil 14 may not be exactly parallel causing unequal pressure to be applied about the periphery of the rim 26 and lid 50 reducing the bond therebetween. The ring 16 similarly compensates these latter deficiencies. This is possible since the drawing process permits the inner edges of the support ledges 22 and 24 to act as fulcrums against the downward force of the drawing bead 46 applied on the upper surface of the rim 26 through lid 50. This drawing and heat sealing independent of the compression forces between support ledges 22 and 24 and heat sealing face 44 avoids any of the problems generally associated with similar heat sealing devices.

The secondary compression seals as well as the drawing bond may be varied by changing the size of the drawing bead 46 relative to the drawing channel 16. In addition, changing the shape of the drawing bead 46 will vary the strength of the drawing bond.

It should be obvious that by changing couplers 30 and anvils 14 cups of various sizes and shapes may be filled by merely changing the components.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for closing and sealing container comprising a reciprocating heat sealing head, a cup retaining means removably mounted on a support means and including a centrally disposed receiving orifice to retain a cup therein, said retaining means comprising a coupler having a substantially annular configuration, said cup retaining means further comprising an annular anvil removably mounted on said coupler and including an annular drawing channel formed in its upper surface, said upper surface comprising a plurality of cup rim support means, said heat sealing head and said cup retaining means arranged in spaced, correspondingly mating positive relative to one another whereby a rim of the cup being sealed and a lid therefore are sealed together under the heat and force of the heat sealing head of the cup retaining means.

2. The device of claim 1 wherein said reciprocating heat sealing head includes a vertically disposed body having a lower extreme terminating in a horizontally disposed heat sealing face, said heat sealing face being substantially parallel to said cup rim support means.

3. The apparatus of claim 2 wherein said heat sealing face further includes an annular drawing bead formed thereon, said annular drawing bead having a diameter substantially equal to the diameter of said annular drawing channel.

4. The device of claim 3 wherein said annular drawing bead and said annular drawing channel are concentrically aligned during the sealing process and wherein the overall dimensions of said annular drawing bead relative to said annular drawing channel are such that said rim of a cup being supported by said cup rim support means is drawn into said channel under the downward movement of said heat sealing head relative to said cup retaining anvil as said annular drawing bead engages said lid sealing said lid to Said cup rim.

* * * * *

UNITED STATES PATENT OFFICE
CERTIFICATE OF CORRECTION

Patent No. 3,760,563          Dated September 25, 1973

Inventor(s) Guenter Zimmermann

It is certified that error appears in the above-identified patent and that said Letters Patent are hereby corrected as shown below:

Column 1, line 17, delete "malies" and insert -- anomalies --.

Column 3, line 36, delete "beads" and insert -- heads --.

Column 3, line 44, delete "A" and insert -- As --.

Column 6, line 6, delete "Said" and insert -- said --.

Signed and sealed this 4th day of June 1974.

(SEAL)
Attest:

EDWARD M. FLETCHER, JR.
Attesting Officer

C. MARSHALL DANN
Commissioner of Patents